US008589353B2

(12) United States Patent
Yao et al.

(10) Patent No.: US 8,589,353 B2
(45) Date of Patent: Nov. 19, 2013

(54) METHOD FOR BACKING UP TERMINAL DATA AND SYSTEM THEREOF

(75) Inventors: Xiao Yao, Shenzhen (CN); Cuirong Huang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/386,418

(22) PCT Filed: Apr. 7, 2010

(86) PCT No.: PCT/CN2010/071619
§ 371 (c)(1),
(2), (4) Date: Feb. 28, 2012

(87) PCT Pub. No.: WO2011/011996
PCT Pub. Date: Feb. 3, 2011

(65) Prior Publication Data
US 2012/0191655 A1    Jul. 26, 2012

(30) Foreign Application Priority Data

Jul. 31, 2009    (CN) .......................... 2009 1 0109188

(51) Int. Cl.
*G06F 17/30*    (2006.01)
(52) U.S. Cl.
USPC ............ 707/646; 707/E17.005; 707/E17.032; 707/999.204
(58) Field of Classification Search
None
See application file for complete search history.

(56) References Cited

U.S. PATENT DOCUMENTS

| 2003/0046313 | A1* | 3/2003 | Leung et al. ............... 707/204 |
| 2003/0061433 | A1* | 3/2003 | Hall et al. ...................... 711/1 |
| 2005/0050117 | A1* | 3/2005 | Seo et al. ................... 707/204 |

FOREIGN PATENT DOCUMENTS

| CN | 1988535 A | 6/2005 |
| CN | 101090330 A | 12/2007 |
| CN | 101662760 A | 3/2010 |
| WO | WO 2007138461 A2 * | 12/2007 |

OTHER PUBLICATIONS

International Search Report for PCT/CN2010/071619 dated Jul. 7, 2010.

* cited by examiner

*Primary Examiner* — Tony Mahmoudi
*Assistant Examiner* — Umar Mian
(74) *Attorney, Agent, or Firm* — Ling Wu; Stephen Yang; Ling and Yang Intellectual Property (57) ABSTRACT

A method and a system for backing up terminal data are disclosed. The scheme is used for solving technical problems that existing ways for backing up terminal data have a low duplicating efficiency and resources are wasted seriously. The scheme creates a terminal index table to maintain data information in a terminal device; when the terminal device newly creates or modifies data contents, information of the index items in the terminal index table and corresponding data contents are sent to a network server; the network server also creates a server index table corresponding to the terminal index table, and the network server stores or deletes data contents of the terminal device according to information such as types and numbers of index items. The scheme can back up terminal data rapidly and simplifies the check procedure, thereby saving memory resources of the terminal device and improving backup efficiency.

10 Claims, 6 Drawing Sheets

METHOD FOR BACKING UP TERMINAL DATA AND SYSTEM THEREOF

TECHNICAL FIELD

The present invention relates to the field of the mobile communication data processing, and specifically, to a method and a system for backing up terminal data.

BACKGROUND OF THE RELATED ART

With the development of technology, a mobile phone becomes a necessity in people's life and work. Mobile phones always store the communication records of users, such as call records, short messages and multimedia messages. Mobile phones also store the information of users such as an address book, pictures, music, audio and video etc. These communication records and information are generally important data, and if the data are not backed up and once the mobile phone is lost or damaged, irretrievable loss will be caused to the users.

In general, a user may back up data into a personal computer by a mobile phone data line, however, such an operation is inconvenient and few users could back up data regularly.

Currently, there is an existing method that proposes to back up the mobile phone data into a network server. A method for backing up mobile phone data into a network server is provided by a patent application named as "method for exchanging information between mobile phone and network server" with Chinese patent application No. CN200710074937.3, and this method needs the user to set the data type to be back up and a backup period and the like. When the backup condition set by the user is met, the mobile phone backs up new data into the server. Before backing up, the mobile phone checks the data that are newly created or are modified after the backup at the last time and before the backup at this time and takes these data as the new data that requires backing up. Furthermore, after the user deleting the data in the mobile phone, the corresponding backed up data in the server could not be automatically deleted, and the user is required to set whether the discarded data should be deleted in the server.

However, in such a system, the user has to set the backup parameter such as backup duration and the backed up data item and the like, thereby causing that the user's operation is very complex. If the user forget to set the backup parameter, such a backup mechanism will be useless. In addition, in order to determine which data are the new data that requires backing up, the mobile phone has to judge the data in the mobile phone one by one, for example, to judge the generation time and the modification time of the data and the like. Such operations consume the memory resource of the mobile phone and also need longer searching time, and have a low backup efficiency. And at last, the server could not automatically delete the backed up data but the user has to set separately, which increases trouble to the user. If the user forgets to set, a lot of memory spaces of the server will be occupied, which causes the waste of resources.

SUMMARY OF THE INVENTION

The technical problem to be solved in the present invention is to provide a method and a system for backing up terminal data, to make the terminal device to be able to rapidly inspect the data state for the backup of the data by creating a data index table, thereby saving the memory resource of the terminal device and improving the backup efficiency.

A method for backing up terminal data is provided based on one aspect of the present invention, and the method comprises following steps:

A, creating a terminal index table, wherein the terminal index table includes a terminal index item corresponding to terminal data;

B, a terminal device checking information in the terminal index item, and sending the information in the terminal index item or sending the information in the terminal index item and the terminal data corresponding to the terminal index item to a network server, and modifying the terminal index table; and C, the network server creating a server index table corresponding to the terminal index table, and executing a terminal data backup operation according to the information in the terminal index item, and modifying the server index table.

Furthermore, before the step A, the method further comprises: a step of the terminal device registering to the network server, in which the terminal device sends identification information of the terminal device to the network server, or the network server obtains the identification information of the terminal device, and the network server creates a corresponding registration relationship between the terminal device and the network server according to the obtained identification information of the terminal device.

Furthermore, after the step A, the method further comprises a step of updating the terminal index table in real-time, in which:

when the terminal index table is created for first time, values of the state fields of all the terminal index items are set to the initial state; when newly creating a data record, the terminal device newly creates a terminal index item or re-uses a terminal index item with the initial state in the state field in the terminal index table, and writes an address where the newly created data record is stored into the address field of the terminal index item, and sets the state field of the terminal index item to the newly created state or the modified state; when modifying a data record, the terminal device finds the terminal index item corresponding to the data record in the terminal index table, and sets the state field of the terminal index item to the newly created state or the modified state; when deleting a data record, the terminal device finds the corresponding terminal index item in the terminal index table according to the address where the data record is stored, and sets the state field of the terminal index item to the deleted state.

Furthermore, in the step A, each terminal index item corresponds to one record of the terminal data, and the index item includes a number field, a state field and an address field, wherein: the number field represents a serial number of the terminal index item; the state field is used for distinguishing a state of data corresponding to the terminal index item, and the state includes: an initial state, an unchanged state, a newly created state, a modified state and a deleted state; the address field is used for indicating a storage address of the data corresponding to the terminal index item in the terminal device.

Furthermore, before the step B, the method further comprises a process of setting a backup condition, wherein the backup condition includes a backup period and a type of the data that require backing up; and the backup condition is set by a system by default or set by a user.

Furthermore, the step B specifically comprises:

if the state field of the checked terminal index item is the newly created state or the modified state, sending the number field of the terminal index item and a data content found according to the address field of the terminal index item to the network server, and modifying the state field of the terminal index item to the unchanged state;

if the state field of the checked terminal index item is the deleted state, sending the number field of the terminal index item to the network server, so as to notify the network server to delete a data content corresponding to the number field, and modifying the state field of the terminal index item to the initial state;

if the state field of the checked terminal index item is not any one of the unchanged state, the newly created state, the modified state and the deleted state, finding a data content according the address field of the terminal index item, and sending the data content and the number field corresponding to the terminal index item to the network server.

Furthermore, the server index table in the step C includes a server index item, and the server index item includes a number field and an address field; the number field of the server index item corresponds to the number field in the terminal index item one to one; the address field in the server index item is used for recording the storage address of backup data in the server.

Furthermore, a process for backing up terminal data in the step C comprises:

when the terminal device sends the number field of the terminal index item and the corresponding data content for asking for new creation or modification, the network server newly creating a server index item or searching the server index item to find the server index item with the same number, and storing the corresponding data content, and writing a server address where the data content is stored into the server address field in the server index item;

when the terminal device sends the number field of the terminal index item for asking for deletion, the network server searching the server index table to find the server index item with the same number, and deleting the data content stored in the server according to the server address field in the server index item.

A system for backing up terminal data is provided based on another aspect of the present invention, and the system comprises a terminal device and a network server, wherein:

the terminal device comprises a terminal index table unit and a sending unit;

the terminal index table unit is configured to create and maintain a terminal index table, wherein the terminal index table includes a terminal index item corresponding to the terminal data;

the sending unit is configured to check information in the terminal index item of the terminal index table unit, and send the information in the terminal index item or send the information in the terminal index item and the data content corresponding the terminal index item to the network server, and notify the terminal index table unit to modify the terminal index table;

the network server comprises a server index table unit and a backup unit;

the server index table unit is configured to create and maintain a server index table corresponding to the terminal index table;

the backup unit is configured to execute a terminal data backup operation according to the information in the terminal index item, and notify the server index table unit to modify the server index table.

Furthermore, each terminal index item in the terminal index table unit corresponds to one record of the terminal data, and the terminal index item includes a number field, a state field and an address field, wherein:

the number field represents a serial number of the terminal index item;

the state field is used for distinguishing a state of data corresponding to the terminal index item, wherein the state includes: an initial state, an unchanged state, a newly created state, a modified state and a deleted state;

the address field is used for indicating a storage address of the data corresponding to the terminal index item in the terminal device.

Furthermore, when the terminal index table unit creates the terminal index table for first time, values of the state fields of all the terminal index items are set to the initial state;

when the terminal device newly creates a data record, the terminal index table unit newly creates a terminal index item or re-uses a terminal index item with the initial state in the state field in the terminal index table, and writes an address where the newly created data record is stored into the address field of the terminal index item, and sets the state field of the terminal index item to the newly created state or the modified state; when the terminal device modifies a data record, the terminal index table unit finds the terminal index item corresponding to the data record in the terminal index table, and sets the state field of the terminal index item to the newly created state or the modified state; when the terminal device deletes a data record, the terminal index table unit finds the corresponding terminal index item in the terminal index table according to the address where the data record is stored, and sets the state field of the terminal index item to the deleted state.

Furthermore, the terminal sending unit comprises:

a first sending unit, which is configured to: when checking a terminal index item with the newly created state or the modified state in the state field, send the number field of the terminal index item and the data content found according to the address field on the terminal device to the network server, and notify the server index table unit to modify the state field corresponding to the terminal index item to the unchanged state;

a second sending unit, which is configured to: when checking a terminal index item with the deleted state in the state field, send the number field of the terminal index item to the network server, so as to notify the network server to delete the data content corresponding to the number, and notify the server index table unit to modify the state field corresponding to the terminal index item to the initial state;

a third sending unit, which is configured to: when checking a terminal index item with a state that is not any one of the unchanged state, the newly created state, the modified state and the deleted state in the state field, find the data content according the address field of the terminal index item, and send the data content and the number field corresponding to the terminal index item to the network server.

Furthermore, the server index table in the server index table unit includes a server index item; the server index item includes a number field and an address field, wherein the number fields in the server index item corresponds to the number fields in the terminal index item one to one; the address field in the server index item is used for recording a storage address of backup data in the server.

Furthermore, the backup unit comprises:

a first backup unit, which is configured to: when the terminal device sends a number field of the terminal index item and a corresponding data content for asking for new creation or modification, newly create a server index item or search the server index table unit to find the server index item with a same number, and store the corresponding data content, and write a server address where the data content is stored into the server address field in the server index item;

a second backup unit, which is configured to: when the terminal device sends a number field of the terminal index item for asking for deletion, search the server index table unit to find the server index item with a same number, and delete the data content stored in the server address according to the server address field.

The present invention creates a terminal index table to maintain the data information in the terminal device; when creating, modifying or deleting the data content, the terminal device sends the information of the index item in the terminal index table and the corresponding data content to the network server; a server index table corresponding to the terminal index table is also created in the network server, and the network server stores or deletes the data content of the terminal device according the information such as the type of the index item and index number of the index item to be able to back up the terminal data rapidly and simplify the check process, thereby saving the memory resource in the terminal device and improving the backup efficiency.

PREFERRED EMBODIMENTS OF THE PRESENT INVENTION

The present invention will be described in detail in combination with drawings and embodiments.

The present invention provides a method for backing up the terminal data, which is mainly to create an index table in the terminal device for recording the state of the terminal data and the storage position of the terminal data. Meanwhile the network server also creates a server index table corresponding to the index table in the terminal device. When the backup condition is met, the terminal device obtains which data require backing up and which kind of backup operation is required by checking the index table, and then sends the data that need to be sent and the index item number to the network server. The network server finds the storage position of the data in the server according to the server index table, thereby executing the operation. It should be noted that the present invention is not limited to be applied in the mobile phone terminal, but may also be applied in other terminal device such as terminal PDA and so on.

Figure 1:
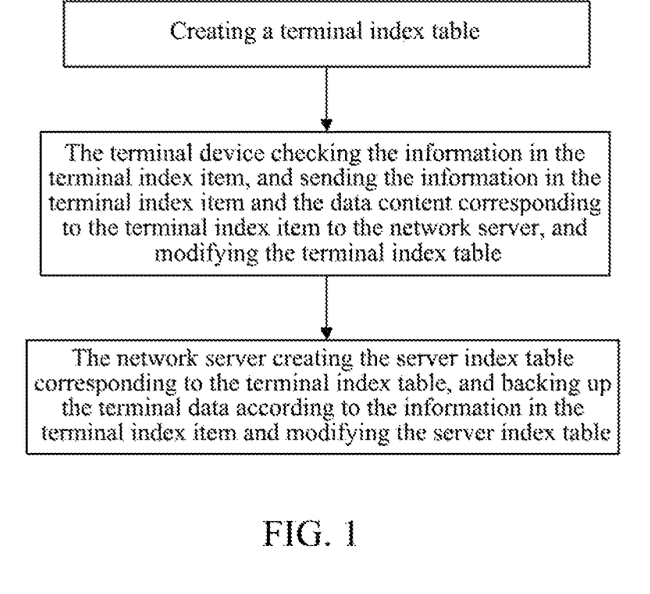
FIG. 1 is a flowchart of main steps of the method according to the present invention.

The present invention provides a method for backing up the terminal data, and as shown in FIG. 1, the method mainly comprises the following steps.

Step 1, a terminal index table is created, and the terminal index table includes a terminal index item corresponding to the terminal data.

Step 2, the terminal device checks the information in the terminal index item, and sends the information in the terminal index item and the data content corresponding to the terminal index item to the network server, and modifies the terminal index table.

Step 3, the network server receives the information in the terminal index item and the data content corresponding to the terminal index item sent by the terminal device, and then creates or updates the server index table corresponding to the terminal index table, and backs up the terminal data according to the information in the terminal index item.

For step 1, the terminal index table includes the terminal index item, and the terminal index item corresponds to the data that needs to be backed up.

The terminal device creates the terminal index table in the terminal device for maintaining the information in the terminal device. The terminal index table is composed of the terminal index table, each index item corresponds to one record of the terminal data, and the index item includes a number field, a state field and an address field, wherein the number field represents the serial number of the terminal index item and is used to identify the data content for the network server in the process of backing up the data; the state field is used to distinguish the state of the data content corresponding to the terminal index item, wherein the state includes: an initial state, an unchanged state, a newly created state, a modified state and a deleted state; the address field is used to represent the storage address in the terminal device of the data content corresponding to the terminal index item, which may be a storage path.

Figure 2:
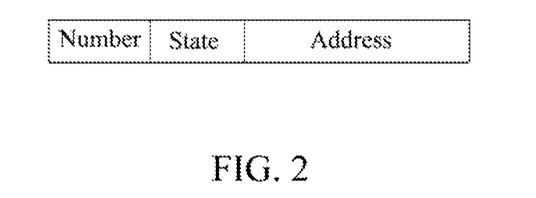
FIG. 2 is a schematic diagram of the structure of the index item of the terminal device index table in the method according to the present invention.

FIG. 2 is a preferred structure of the terminal index table. The terminal device respectively maintains a terminal index table for each type of data that the user needs to back up, such as short messages, multimedia messages, call records, and the address book. The terminal index table of the terminal device is stored in a form of files, and each terminal index item records a piece of relevant information of the data. Preferably, the number field may be set as three bits, the state field may be set as one bit, and the address field may be a character string for filling in the path where the terminal data are stored. The state field may use 0 to represent the initial state, that is, the terminal index item is NULL; 1 represents the newly created state or modified state; 2 represents the deleted state; 3 represents the unchanged state; in the case that the judgment condition of the program makes an error, or the data runaway or the out of the bound of the array occurs, the value of the state bit may be a value that is not 0, 1, 2, or 3, as in an abnormal state that does not belong to any one state of the initial state, newly created state, modified state, deleted state and unchanged state.

The value indicating the state may change as long as this value may distinguish the above different states.

For example one terminal index item in the terminal index table of one short message:

| 011 | 1 | C:\short message\06 | that represents the 11$^{th}$ terminal index item of the short message in the modified state, and the storage path is the 6$^{th}$ in the folder of the short message under the C disk, namely, C:\short message\06.

| 002 | 3 | C:\call record\07 | that represents the second terminal index item in the terminal index table of the call record in the unchanged state, that is, there has not been changed since the backup at the last time. The storage path is the 7$^{th}$ in the folder of the call record under the disk C, namely, C:\call record\07.

In addition to the above ways, the terminal index table may have other structures, for example, the order of the fields may be exchanged, or other information fields may be added, for example:

| state | number | address | and

| number | state | address | other | so on.

For step 2, the terminal device checks the information in the terminal index table which includes the number field, the state field and the address field, and sends the terminal data that needs to be backed up to the network server, and maintains the information in the terminal index table.

When the backup condition is met, the terminal device checks the value of the state field of each terminal index item in the terminal index table, to determine whether the data corresponding to the terminal index item changes or not between the backup at last time and the backup at this time.

If the state field of a terminal index item is checked as a newly created state or a modified state, the number field and the data content found according to the address field are sent to the network server, and the state field is modified into the unchanged state;

if the state field of a terminal index item is checked as a deleted state, the number field is sent to the network server, to notify the network server to delete the data content corresponding to the number, and the state field is modified into the initial state;

if the state field of a terminal index item is checked as a state that is not any one of the unchanged state, the newly created state, the modified state and the deleted state, that is to say an abnormality occurs, the data content is found according its address field, and the data content and the number field are sent to the network server.

Figure 3:
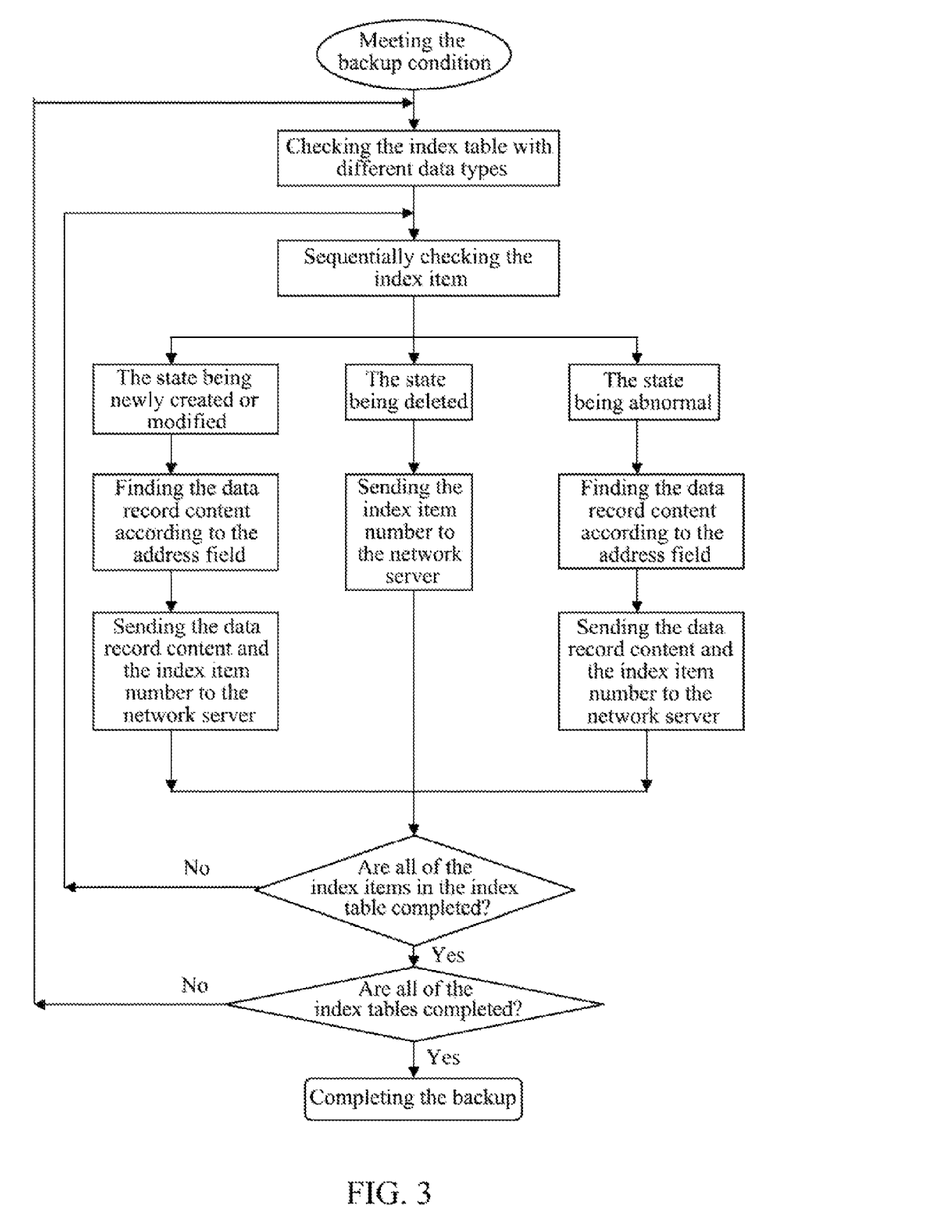
FIG. 3 is a flowchart of the terminal device backing up data based on the index table in the method according to the present invention.

FIG. 3 is a procedure of checking the index table and performing backup by the terminal device.

When the backup condition is met, the terminal device checks the state of each terminal index item in the terminal index table. When it is found that the state is the newly state or the modified state, the terminal device sends the number and the data content found according to the address field to the network server, and modifies the state field to the unchanged state.

For example: a searched terminal index item of an address book is:

| 010 | 1 | C:\address book\12 |

At this point, the specific content of this record of the address book is found according to C:\address book\12, and is sent to the network server together with the number 010, and the terminal index item is finally modified into:

| 010 | 3 | C:\address book\12 |

When it is found that the state is the deleted state, its number is sent to the network server, and the state field is modified into the initial state. The state field being modified into the initial state means that the number of the terminal index item is released and may be re-used, and the new record may be created in this terminal index item.

For example, a searched index of an address hook is:

| 009 | 2 | C:\address book\12 |

The number 009 is sent to the network server, and the state field is modified into the initial state.

| 009 | 0 | C:\address book\12 |

When the state is found as the abnormal state, its number and the data content found according to the address field are sent to the network server, and the state field is modified into the unchanged state.

For example: a searched index of an address book is:

| 019 | 5 | C:\address book\12 |

At this point, the specific content of this record of the address book is found according to C:\address book\12, and is sent to the network server together with the number 010, and the terminal index item is finally modified into:

| 019 | 3 | C:\address book\12 |

For step 3, the server index table is created in the network server, and the network server performs the backup based on the backup request of the terminal device and maintains the server index table.

The server index table corresponding to the terminal device is created in the network server, and the index item numbers of the two index tables are one-to-one correspondence. The server index table includes the server index item, and the server index item also includes a number field and an address field, wherein the number fields of the server index table and the terminal index table are one-to-one correspondence; the address field is used to record the address where the backup data are stored in the server.

Figure 4:
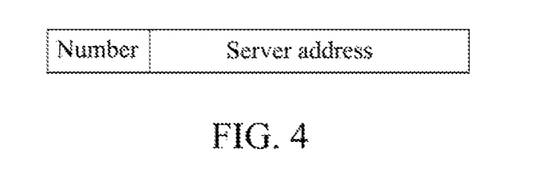
FIG. 4 is a schematic diagram of the structure of the index item of the index table of the network server in the method according to the present invention.

FIG. 4 is the structure of the index item of the index table in the network server.

Figure 5:
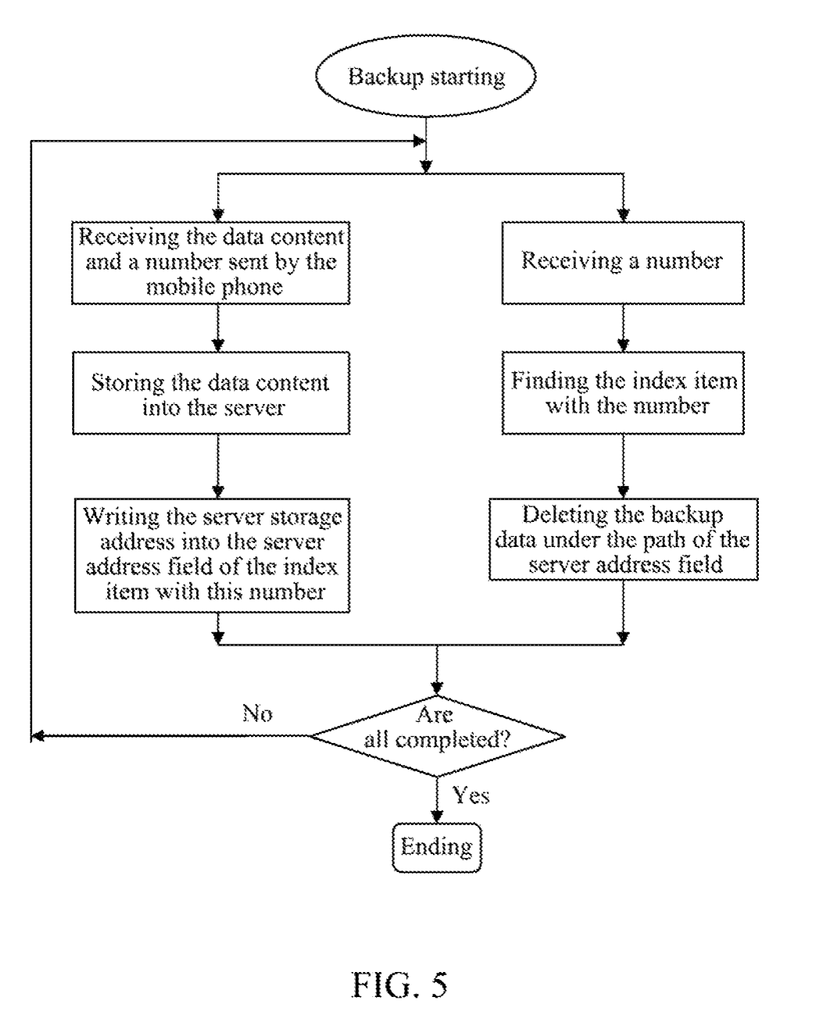
FIG. 5 is a flowchart of the network server backing up data based on the data sent by the terminal device in the method according to the present invention.

FIG. 5 is a procedure of the backup of the network server:

when the terminal device sends the number field of the terminal index item and the corresponding data content to ask for new creation or modification, the network server searches the server index item with the same number and stores the corresponding data content, and writes the address of the data content in the server into the server address field of the server index item;

when the terminal device sends the number of the terminal index item to ask for deleting, the network server searches the server index item with the same number, and deletes the data content stored in the server address according the server address field.

Corresponding to the index table of the terminal device, the network server may respectively maintain the server index tables according different data types. The server index table may be stored in a form of files, and each index item corresponds to the index item in the index table in the terminal device. The index item of the server index table at least includes a number field and a server address field. Preferably, the number field is set as three bits, and the server address field is set as one character string used for filling in the storage path of the backup data in the server. The number of the server index item should be in accordance with the number of the index item in the terminal device.

For example, when there is a short message index item in the terminal device:

| 011 | 1 | C:\short message\06 |
|---|---|---| after backing up this short message in the server, the server index item of the short message should be:

| 011 | H:\terminal device xxxx\short message\06 |
|---|---| wherein the number 011 is in accordance with the index item number in the terminal device.

When the network server receives the number and data content sent by the terminal device, the network server finds the index item with the same number and writes the address where the backed up data content is stored in the server into the address file of this index item.

For example: if number 010 is received and the content of the short message is "Hello", then the "Hello" is stored into the server with the path of H:\terminal device xxxx\short message\11. The 010$^{th}$ item in the server index table is found and the address is written into to get:

| 010 | H:\terminal device xxxx\short message\11 |
|---|---|

When the network server receives the number sent by the terminal device and is requested to delete the backup, the network finds the index item according to the number, and deletes the data content according to the value of the address field.

For example: if the address book number 009 is received and the index item is searched:

| 009 | H:\terminal device xxxx\address book\22 |
|---|---| then this record is found according to the path H:\terminal device xxxx\address book\22 for deleting.

The implementation of the technical scheme of the present invention will be further described in detail in combination with the application examples.

Embodiment 1

In this preferred embodiment, a step of registering the terminal device to the network server is further comprised before step 1, which comprises: the terminal device sending the identification information to the network server or the network server obtaining the identification information of the terminal device, and the network server creating the corresponding registration relationship between the terminal device and the network server, wherein the terminal device includes a mobile phone or a PDA, and the identification information includes a mobile phone number, an IP address or a terminal device number.

The present invention may let the user terminal device register in the network server, thereby creating the corresponding relationship between the terminal device and the network server. The registration may be completed in a way of the user terminal device sending the terminal device number to the network server. Or otherwise, the network server initiates the registration and obtains the terminal device number to complete the corresponding registration relationship between the terminal device and the network server. During the registration process, the user may set the registration password and also may change the password after completing the registration.

Figure 6:
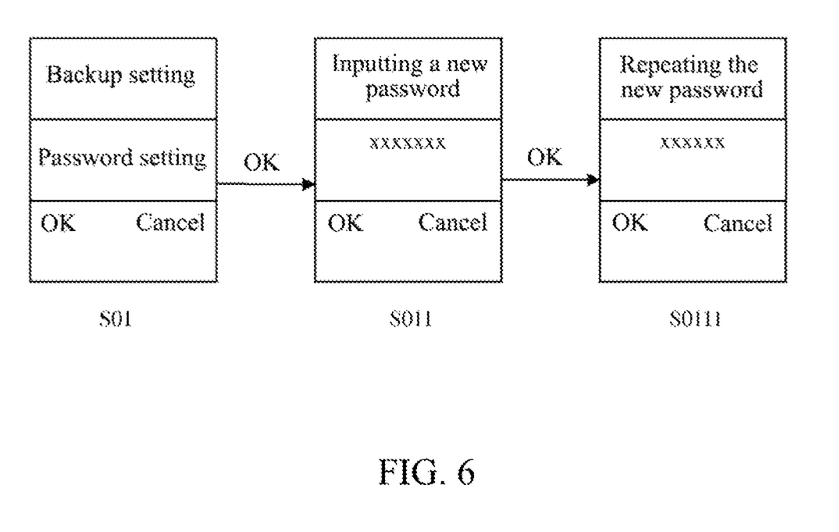
FIG. 6 is a schematic diagram of a procedure of establishing a registration relationship between the terminal device and the network server in the method according to the present invention.

As shown in FIG. 6, this preferred embodiment is a process of the terminal device user completing the registration by setting the password, which comprises following specific steps.

Step 1, the backup setting menu of the terminal device in entered, as interface S01 shown in FIG. 6.

Step 2, in interface S01, the user selects "password setting" to enter interface S011 in the figure.

Step 3, in interface S011, the user inputs a new password and clicks OK to enter interface S0111 in the figure.

Step 4, in interface S0111, the user re-inputs the new password and clicks OK, and the terminal device sends the password to the network server through a short message for registering.

Step 5, the network server receives the registration short message and then returns a short message to the terminal device, this short message will not be displayed to the user, and the terminal device receives the short message and identifies the registration flag bit for representing that the registration is successful.

Step 6, if the registration fails, a prompt box pops up to prompt the user, the interface S0111 is displayed after the user clicking "OK", and the user may register again.

Embodiment 2

For step 1, the process of the index table being updated in real-time according to the changes of the user terminal data comprises:

when newly creating on record, the terminal device finding a terminal index item with an initial state in the state field from the terminal index table, and writing the address, where the newly created record is stored, into the address field of the terminal index item, and setting the state field to the newly created state or the modified state; when modifying a record, the terminal device finding a terminal index item corresponding to the record from the terminal index table, and setting the state field to the newly created state or the modified state; when deleting a record, the terminal device finding the corresponding terminal index item according to the address from the terminal index table, and setting the state field to the deleted state. For example:

when the user newly creates a record, for example receives or sends a short message or a multimedia message, or completes a call, or completes to edit a record of the address book, an index item with an initial state in the state field is found in the index table, and the address where the short message or the multimedia message is stored is written into the address field of the index item, and the state field is set to a newly created state or a modified state;

when the user modifies a record, for example modifies a record of the address book, the index item corresponding to the record is found in the index table, and the state field is set to a newly created state or a modified state;

when the user deletes a short message or a multimedia message, or deletes a call record or deletes a record of the address book, the corresponding index item in the index table is found according the address, the address field in the index item is deleted and the state field is set to the deleted state.

Through the above steps, the user terminal device completes the maintenance of the index table.

Figure 7:
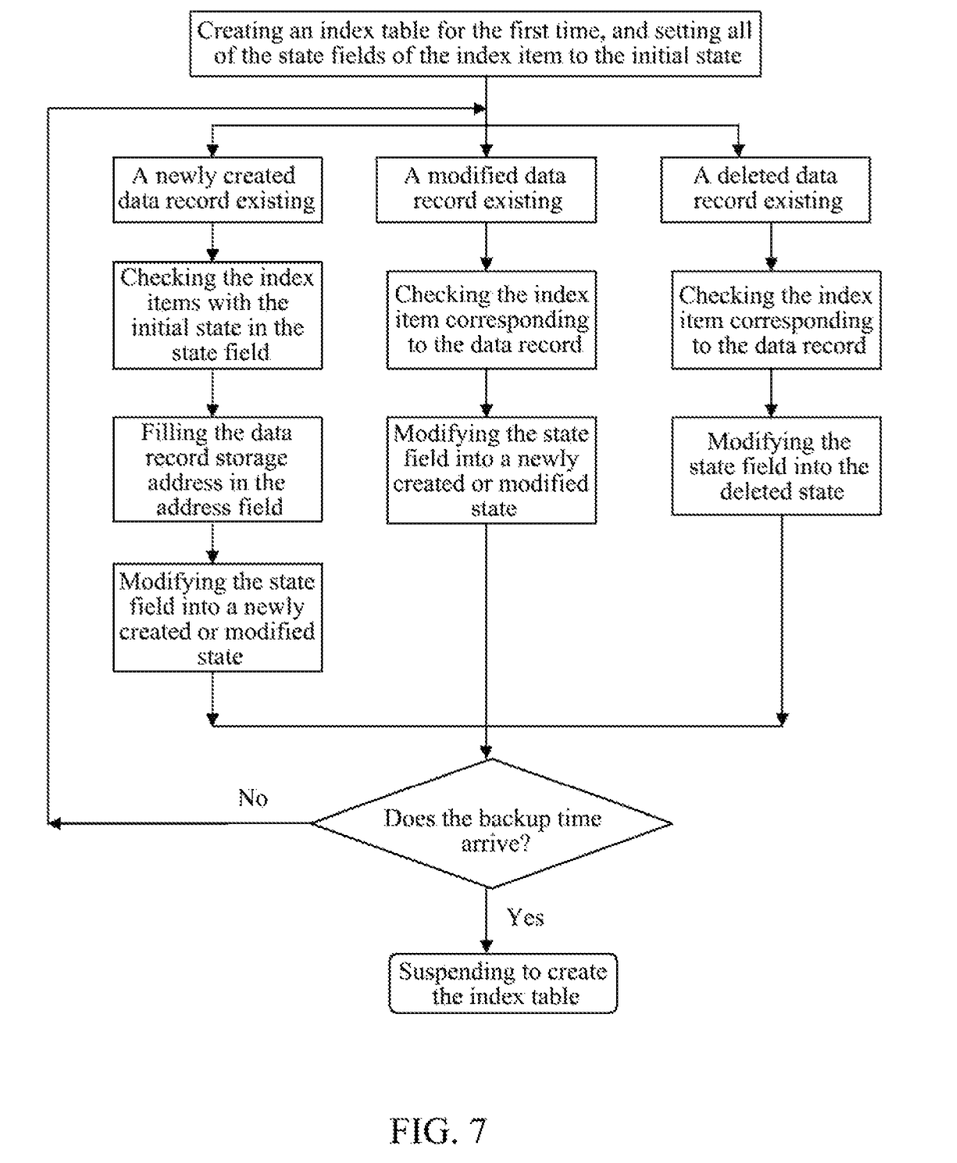
FIG. 7 is a flowchart of the procedure of creating and maintaining the index table by the terminal device in the method according to the present invention.

FIG. 7 is a preferred embodiment of the process of creating and maintaining the index table for the user terminal device.

When the index table is created for the first time, all of the state fields are set to the initial state. For example, the state field may be set to 0 representing the initial state.

When the user terminal device has a new data record, for example, a short message or a multimedia message is received or edited and sent, or a call ends, or a record of the address book is edited, an index item needs to be newly created to record the data information. Here the terminal device sequentially retrieves the state fields in the index table corresponding to the data type, and when finding an index item with the initial state, writes the storage address of the newly created data into the address field of the index item and modifies the state field into the newly created state or the modified state.

For example, the user receives a short message and stores it in the path C:\short message\10, it is found that the state of the index item 012 is 0 by retrieving the short message index table.

| 012 | 0 | |
|---|---|---| fill address where the short message is stored into the index, and the state is modified:

| 012 | 1 | C:\short message\10 |
|---|---|---|

When modifying an existing data record, the user needs to search the index table to find the record, and change the state into a newly created state or a modified state.

For example, there is a record of the address book that has been backed up, and the index item of it in the index table is:

| 010 | 3 | C:\address book\12 |
|---|---|---|

The state is 3 representing that the backup at the last time is completed. Here the user modifies the index item, in which the state should be modified into 1 to get:

| 010 | 1 | C:\address book\12 |
|---|---|---|

When deleting the existing data record, the user needs to search the index table to find the record and change the state into 2. Meanwhile, the value in the address field may be also deleted.

For example, there is a record of the address book that has been backed up, and the index item in the index table is:

| 009 | 3 | C:\address book\12 |
|---|---|---| this record of the address book is deleted, and the index item should be:

| 009 | 2 | C:\address book\12 |
|---|---|---| or, the content in the address field is deleted at the same time, and the index item should be:

| 009 | 2 | |
|---|---|---|

Embodiment 3

In this preferred embodiment, a process of setting the backup condition may also be comprised before step 2; the backup condition includes a backup period and a type of the data that require backing up; the backup condition is set by the system by default or set by the user. The user can set the information such as the backup period and the type of data that require backing up. However, if the user does not set that, the terminal device has default backup condition values, for example, the backup period is 24 hours, and the type of the data that require backing up includes a short message, a multimedia message, a call record, and an address book. Thus, the undesirable results probably brought by the user forgetting to set that may be avoided.

Figure 8:
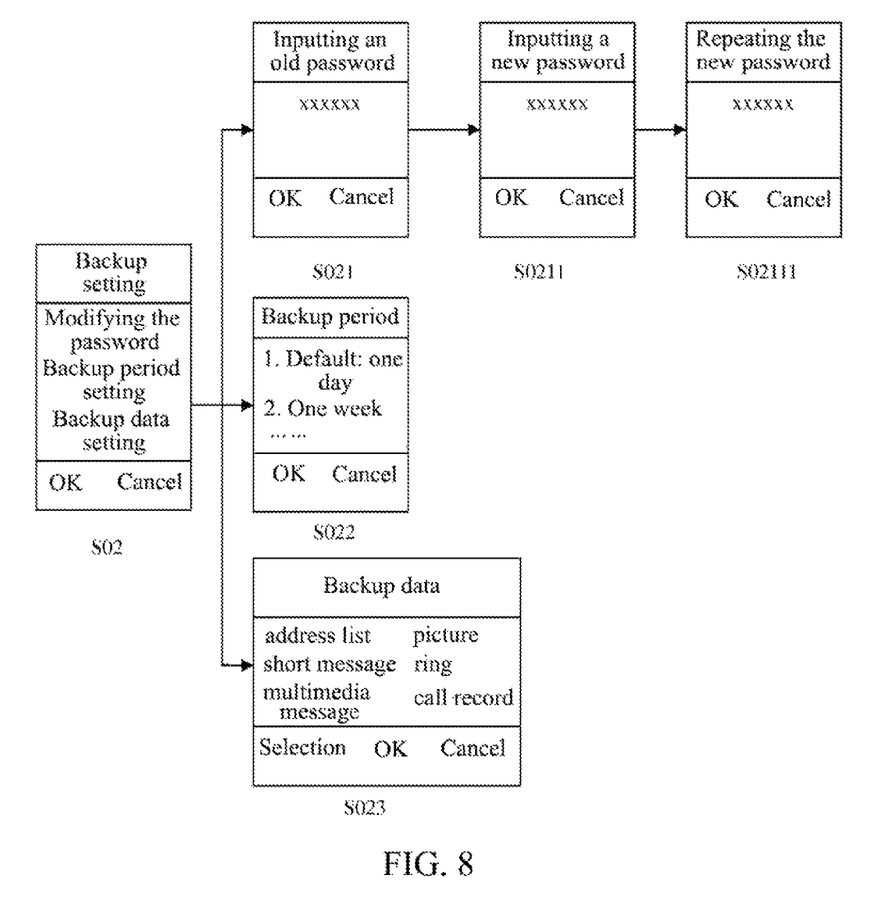
FIG. 8 is a schematic diagram of the procedure of setting the backup period, backup data and password by the terminal device in the method according to the present invention.

As shown in FIG. 8, this preferred embodiment describes that the user may change the password and set the backup condition in place of the default backup condition after completing the corresponding relationship between the terminal device and the network server, and the steps of the embodiment are as follows.

Step 1, the backup setting menu of the terminal device is entered, and the backup setting menu is as shown in the interface S02 in the figure after successful registration.

Step 2, in interface S02, the first item "modifying the password" of the menu is selected to enter the interface S021 which requests the user to input the old password; the user completes to input the old password and clicks OK to enter interface S0211 which requests the user to input a new password; the user completes to input the new password and clicks OK to enter interface S02111 which requests the user to input the new password again; the user completes to input the new password and clicks OK, the terminal device sends the new password to the network server to update the password.

Step 3, in interface S02, the second item "backup period setting" of the menu is selected to enter interface S022, the user may select different backup periods, and if the user does not set that, the default value is one day. After the user completing the setting, the terminal device sends the modified backup period to the network server.

Step 4, in interface S02, the third item "backup data setting" of the menu is selected to enter interface S023, the user may select the type of the data that require backing up, and if the user does not set that, the default backup data types are the address book, the short message and the multimedia message. After the user completes the setting, the terminal device sends the modified backup data type to the network server.

The present invention also provides a system for backing up the terminal data, to implement the above-mentioned backup method in the terminal device and the network server, and the system comprises a terminal device and a network server.

The terminal device comprises a terminal index table unit and a sending unit; the terminal index table unit is configured to create and maintain the terminal index table, wherein the terminal index table includes a terminal index item corresponding to the terminal data; the sending unit is configured to check the information in the terminal index item of the terminal index table unit, and send the information in the terminal index item and the data content corresponding the terminal index item to the network server, and notify the terminal index table unit to modify the terminal index table.

The network server comprises a server index table unit and a backup unit; the server index table unit is configured to create and maintain the server index table corresponding to the terminal index table; the backup unit is configured to execute the backup operation according to the information in the terminal index item and the terminal data, and notify the server index table unit to modify the server index table.

1. The Terminal Device

Figure 9:
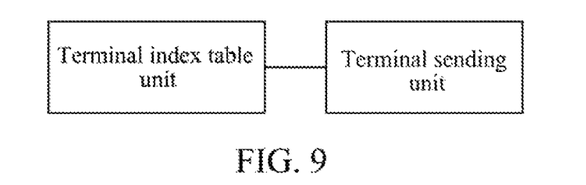
FIG. 9 is a schematic diagram of the terminal device apparatus module of the system according to the present invention.

FIG. 9 is a terminal apparatus for backing up the terminal data. In the system of the present invention, the terminal device comprises a terminal index table unit and a terminal sending unit.

(1) In the terminal index table unit, each terminal index item corresponds to a record of the terminal data, and the index item includes: a number field, a state field and an address field, wherein the number field represents the serial number of the terminal index item, and is used for transferring information to the network server in the data backup process; the state field is used for distinguishing the state of the data content corresponding to the terminal index item, and the state includes: an initial state, an unchanged state, a newly created state, a modified state and a deleted state; the address field is used for representing the storage address of the data content corresponding to the terminal index item in the terminal device.

When the terminal index table unit creates the terminal index table for the first time, the values of the state fields of all the terminal index items are the initial state.

When the terminal device newly creates a data record, the terminal index table unit newly creates or re-uses a terminal index item with the initial state in the state field in the terminal index table, and writes the storage address where the newly created data record is stored into the address field of the terminal index item, and sets the state field to the newly created state or the modified state.

When the terminal device modifies a data record, the terminal index table unit finds a terminal index item corresponding to the data record in the terminal index table, and sets the state field to the newly created state or the modified state.

When the terminal device deletes a data record, the terminal index table unit finds the corresponding terminal index item according to the address of the data record in the terminal index table, and sets the state field to the deleted state.

Preferably, the terminal index table unit further includes an index table generating unit configured to create the index table, an index table maintaining unit configured to maintain the index table, a backup condition judging unit configured to judge whether there is a need for executing the backup or not, a data state checking unit configured to retrieve whether there are the data that require backing up in the terminal index table, and a backup operating unit configured to send backup data and the terminal index item information to the server.

This preferred embodiment will be described by taking an example.

1. The index table generating unit in the terminal device creates an index table, wherein the index table is composed of index items, and the form of the index item is as shown in FIG. 3. The state field is initial state 0. For example, the first index item is:

| 001 | 0 |
|---|---|

2. The terminal device user newly creates a record of the address book and is put into the terminal device C:\address book\40, and the index table maintaining unit checks the index item in the index table of the address hook and finds that the state field of the $20^{th}$ index item is 0:

| 020 | 0 |
|---|---| then fills the address in the index item and changes the state to get:

| 020 | 0 | C:\address book\40 |
|---|---|---|

3. The backup condition judging unit executes backup every 24 hours according to the backup condition, and when the address book needs to be backed up and the backup condition is met, the backup condition judging unit sends the backup start signal to a data state checking unit.

4. The data state checking unit receives the backup start signal and then checks the index table. When finding that the index table of the address book includes such an index item as follows:

| 020 | 1 | C:\address book\40 |
|---|---|---| the data state checking unit sends the index result to the backup operating unit.

5. Since the state field is 1, the backup operating unit sends the content in the address of C:\address book\40 together with 020 to the network server. After that, the backup operating unit sends a backup completion signal to the index table maintaining unit.

6. The index table maintaining unit modifies the index item information into:

| 020 | 3 | C:\address book\40 |
|---|---|---|

(2) The terminal sending unit generally comprises three sending units.

The first sending unit, which is configured to: when checking a terminal index item with the newly created state or the modified state in the state field, send the number field of the terminal index item and the data content found according to the address field to the network server, and notify the server index table unit to modify the state field corresponding to the terminal index item into the unchanged state.

The second sending unit, which is configured to: when checking a terminal index item with the deleted state in the state field, send the number field of the terminal index item to the network server, so as to notify the network server to delete the data content corresponding to the number, and notify the server index table unit to modify the state field corresponding to the terminal index item into the initial state.

The third sending unit, which is configured to: when checking a terminal index item with a state that is not any one of the unchanged state, the newly created state, the modified state and the deleted state in the state field, find the data content according its address field, and send the data content and its number field to the network server.

2. Server Device

Figure 10:
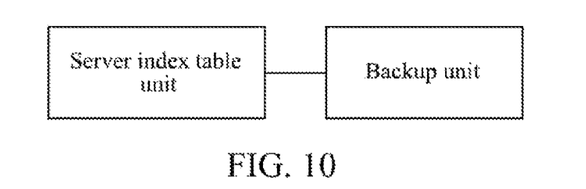
FIG. 10 is a schematic diagram of the network server apparatus module of the system according to the present invention.

As shown in FIG. 10, a network server for backing up terminal data according to the present invention generally comprises a server index table unit and a backup unit.

(1) In the server index table unit, the server index table includes a server index item; the server index item includes a number field and an address field; wherein the number field in the server index item corresponds to the number field in the terminal index item one to one; the address field in the server index item is used to record the storage address of the backup data in the server.

This preferred embodiment will be described by taking examples.

1. The network server receives number 020 and a record of the address book.

2. The server backup unit stores this record of the address book into the address H:\terminal device xxxx\address book\100 in the network server.

3. The server backup unit sends the address to the server index table maintaining unit.

4. The server index table maintaining unit finds the index item 020 in the index table of the address book, and fill the address in the server address field to get:

| 020 | H:\terminal device xxxx\address book\100 |
|---|---|

(2) The backup unit generally comprises two backup units.

The first backup unit, which is configured to: when the terminal device sends the number field of the terminal index item and the corresponding data content for asking for new creation or modification, newly create or search the server index table unit to find the server index item with the same number, and store the corresponding data content, and write the server address where the data content is stored into the server address field in the server index item.

The second backup unit, which is configured to: when the terminal device sends a number field of the terminal index item for asking for deletion, search the server index table unit to find the server index item with the same number, and delete the data content stored in the server address according to the server address field.

What is claimed is:

1. A method for backing up terminal data, comprising following steps of:

A, creating a terminal index table, wherein the terminal index table includes at least one terminal index item corresponding to terminal data;

wherein, each terminal index item corresponds to one record of the terminal data, and the terminal index item includes a number field, a state field and an address field, wherein:

the number field represents a serial number of the terminal index item;

the state field is used for distinguishing a state of data corresponding to the terminal index item, and the state includes: an initial state, an unchanged state, a newly created state, a modified state and a deleted state;

the address field is used for indicating a storage address of the terminal data corresponding to the terminal index item in the terminal device;

B, a terminal device checking information in a terminal index item, wherein:

if the state field of the checked terminal index item is the newly created state or the modified state, sending the number field of the terminal index item and a data content found according to the address field of the terminal index item to a network server, and modifying the state field of the terminal index item to the unchanged state;

if the state field of the checked terminal index item is the deleted state, sending the number field of the terminal index item to a network server, so as to notify the network server to delete a data content corresponding to the number field, and modifying the state field of the terminal index item to the initial state;

if the state field of the checked terminal index item is not any one of the unchanged state, the newly created state, the modified state and the deleted state, finding a data content according to the address field of the terminal index item, and sending the data content and the number field corresponding to the terminal index item to a network server; and C, the network server creating a server index table corresponding to the terminal index table, and executing a terminal data backup operation according to the information in the terminal index item, and modifying the server index table.

2. The method according to claim 1, before the step A, further comprising: a step of the terminal device registering to the network server, in which the terminal device sends identification information of the terminal device to the network server, or the network server obtains the identification information of the terminal device, and the network server creates a corresponding registration relationship between the terminal device and the network server according to the obtained identification information of the terminal device.

3. The method according to claim 1, after the step A, further comprising a step of updating the terminal index table in real-time, in which:

when the terminal index table is created for first time, values of the state fields of all the terminal index items are set to the initial state;

when newly creating a data record, the terminal device newly creates a terminal index item or re-uses a terminal index item with the initial state in the state field in the terminal index table, and writes an address where the newly created data record is stored into the address field of the terminal index item, and sets the state field of the terminal index item to the newly created state or the modified state;

when modifying a data record, the terminal device finds the terminal index item corresponding to the data record in the terminal index table, and sets the state field of the terminal index item to the newly created state or the modified state;

when deleting a data record, the terminal device finds the corresponding terminal index item in the terminal index table according to the address where the data record is stored, and sets the state field of the terminal index item to the deleted state.

4. The method according to claim 1, before the step B, further comprising a process of setting a backup condition, wherein the backup condition includes a backup period and a type of the data that require backing up; and the backup condition is set by a system by default or set by a user.

5. The method according to claim 1, wherein the server index table in the step C includes a server index item, and the server index item includes a number field and an address field; the number field of the server index item corresponds to the number field in the terminal index item one to one; the address field in the server index item is used for recording the storage address of backup data in the server.

6. The method according to claim 5, wherein a process for backing up terminal data in the step C comprises:

when the terminal device sends the number field of the terminal index item and the corresponding data content for asking for new creation or modification, the network server newly creating a server index item or searching the server index table to find the server index item with the same number, and storing the corresponding data content, and writing a server address where the data content is stored into the server address field in the server index item;

when the terminal device sends the number field of the terminal index item for asking for deletion, the network server searching the server index table to find the server index item with the same number, and deleting the data content stored in the server according to the server address field in the server index item.

7. A system for backing up terminal data, comprising a terminal device and a network server, wherein:

the terminal device comprises a terminal index table unit and a sending unit;

the network server comprises a server index table unit and a backup unit;

the terminal index table unit is configured to create and maintain a terminal index table, wherein the terminal index table includes at least one terminal index item corresponding to the terminal data;

wherein each terminal index item in the terminal index table unit corresponds to one record of the terminal data, and the terminal index item includes a number field, a state field and an address field; wherein:

the number field represents a serial number of the terminal index item;

the state field is used for distinguishing a state of data corresponding to the terminal index item, wherein the state includes: an initial state, an unchanged state, a newly created state, a modified state and a deleted state;

the address field is used for indicating a storage address of the data corresponding to the terminal index item in the terminal device;

the terminal sending unit comprises:

a first sending unit, which is configured to: when checking a terminal index item with the newly created state or the modified state in the state field, send the number field of the terminal index item and the data content found according to the address field to the network server, and notify the server index table unit to modify the state field corresponding to the terminal index item to the unchanged state;

a second sending unit, which is configured to: when checking a terminal index item with the deleted state in the state field, send the number field of the terminal index item to the network server, so as to notify the network server to delete the data content corresponding to the number, and notify the server index table unit to modify the state field corresponding to the terminal index item to the initial state;

a third sending unit, which is configured to: when checking a terminal index item with a state that is not any one of the unchanged state, the newly created state, the modified state and the deleted state in the state field, find the data content according to the address field of the terminal index item, and send the data content and the number field corresponding to the terminal index item to the network server;

the server index table unit is configured to create and maintain a server index table corresponding to the terminal index table;

the backup unit is configured to execute a terminal data backup operation according to the information in the terminal index item, and notify the server index table unit to modify the server index table.

8. The system according to claim 7, wherein, when the terminal index table unit creates the terminal index table for first time, values of the state fields of all the terminal index items are set to the initial state;

when the terminal device newly creates a data record, the terminal index table unit newly creates a terminal index item or re-uses a terminal index item with the initial state in the state field in the terminal index table, and writes an address where the newly created data record is stored into the address field of the terminal index item, and sets the state field of the terminal index item to the newly created state or the modified state;

when the terminal device modifies a data record, the terminal index table unit finds the terminal index item corresponding to the data record in the terminal index table, and sets the state field of the terminal index item to the newly created state or the modified state;

when the terminal device deletes a data record, the terminal index table unit finds the corresponding terminal index item in the terminal index table according to the address where the data record is stored, and sets the state field of the terminal index item to the deleted state.

9. The system according to claim 7, wherein the server index table in the server index table unit includes a server index item; the server index item includes a number field and an address field, wherein the number field in the server index item corresponds to the number field in the terminal index item one to one; the address field in the server index item is used for recording a storage address of backup data in the server.

10. The system according to claim 9, wherein the backup unit comprises:
   a first backup unit, which is configured to: when the terminal device sends a number field of the terminal index item and a corresponding data content for asking for new creation or modification, newly create a server index item or search the server index table unit to find the server index item with a same number, and store the corresponding data content, and write a server address where the data content is stored into the server address field in the server index item;
   a second backup unit, which is configured to: when the terminal device sends a number field of the terminal index item for asking for deletion, search the server index table unit to find the server index item with a same number, and delete the data content stored in the server address according to the server address field.

* * * * *